June 17, 1941.  F. H. FRANTZ  2,245,970
STRAIGHT SCALE INDICATOR
Filed May 13, 1940
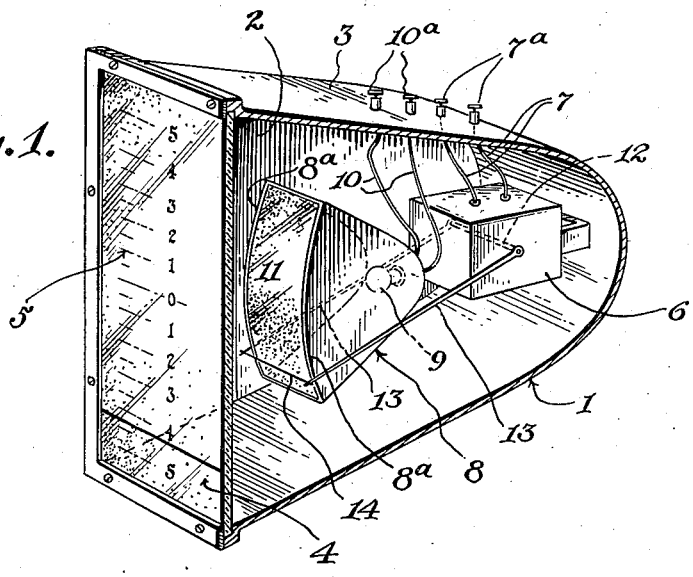
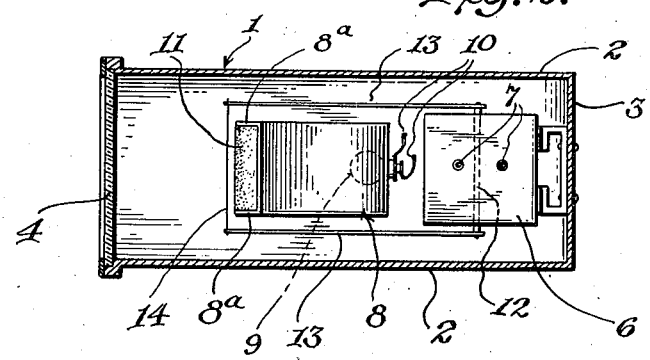
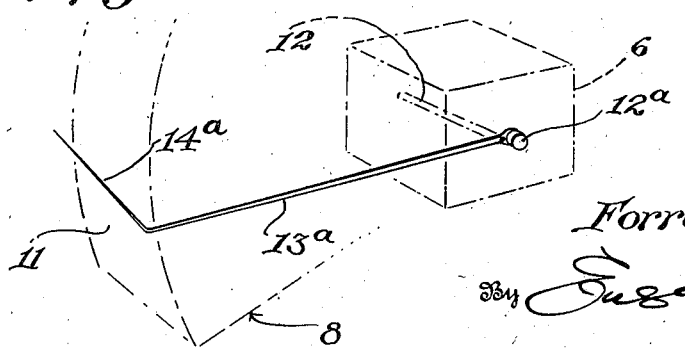
Inventor
Forrest H. Frantz Patented June 17, 1941

2,245,970

UNITED STATES PATENT OFFICE 2,245,970

STRAIGHT SCALE INDICATOR

Forrest H. Frantz, Coplay, Pa.

Application May 13, 1940, Serial No. 334,967

3 Claims. (Cl. 88—24)

This invention relates to scale indicators, and more particularly to straight scale indicators, of the type which are illuminated from behind and a shadow of the index member projected upon a suitably calibrated scale so as to give a reading thereof. Such scale indicators are applicable for use in connection with electrical meters, speedometers, radio receiving sets, and in fact almost any apparatus in which a scale reading is called for.

An important object of my invention is to provide a straight scale indicator so constructed and arranged that the shaft carrying the index member and the flat translucent screen upon which the scale markings appear are located in spaced parallel planes and suitably illuminated so that as the shaft is rotated to various extents, moving the index member in an arcuate path, the shadow of the index member is projected upon the straight scale, rendering the scale more easily and accurately read by eliminating parallax and by spreading the scale markings suitable distances apart.

Another object of my invention is to provide a straight scale indicator of the above character that may be readily built into the housing of the apparatus with which it is to be associated so as to take up little room and to provide a neat appearance by reason of the concealment of the indicator in protected out-of-the-way position.

Still another object of my invention is to provide a straight scale indicator of the above character which, while of simple and economical construction, is at the same time convenient and reliable in operation.

Other objects and advantages will be apparent from the following detailed description of a preferred embodiment of the invention, reference being had to the annexed drawing, in which:

Figure 1 is a perspective view of a voltmeter housing including a galvanometer and a straight scale indicator for furnishing a reading of the galvanometer, one side of the housing being omitted for clearness;

Figure 2 is a transverse cross-sectional view of the housing of Fig. 1; and

Figure 3 is a detail view of a slightly modified form of index member forming part of the straight scale indicator.

In Fig. 1 is shown a sheet metal housing 1 for a voltmeter having a pair of side walls 2 comparatively closely spaced together, (one of said side walls being omitted for clearness) and an enclosing top and bottom section 3 which extends between the side walls and closes the top, bottom and rear end of the housing. The housing is shown as of expanding height from its rear end toward its forward end for convenience in removably mounting it, for example, within a panel upon the instrument board of an automobile, but the housing may assume other shapes if desired.

The forward end of the housing is closed by a flat translucent screen 4 of tinted celluloid or ground glass upon which is marked a straight vertical scale 5 suitably calibrated in voltage readings. Located within the housing adjacent its rear end is a galvanometer 6 forming part of a conventional voltmeter, and this galvanometer is in circuit with a pair of wires 7 leading exteriorly of the housing to a pair of binding posts 7a and adapted to be connected to the main line of the automobile electrical system.

Immediately forwardly of the galvanometer and suitably spaced from the screen 4 is a reflector 8 which is curved in the form of a parabola and closed upon its sides by walls 8a. The reflector is directed toward the screen 4 and centrally mounted upon the reflector is an electric lamp 9 in circuit with conductors 10 leading outside the housing to binding posts 10a by which they may be connected to a source of electric current.

The front of the reflector is closed by an arcuately curved diffusion member 11 of translucent material, such as celluloid, for diffusing the light reflected from the lamp 9 and spreading it evenly over the surface of the screen 4 carrying the scale. Mounted upon a horizontal rotary shaft 12 forming part of the galvanometer 6 and disposed in a plane parallel to the screen 4 is a pair of arms 13 extending to a position a short distance in advance of the diffusion member. A wire filament 14 extends horizontally between the free ends of the arms so as to overlie the diffusion member and define an index member for the scale. Thus, when the galvanometer is operatively connected to a source of current, the galvanometer shaft 12 (which corresponds to the usual pointer shaft of such galvanometers) will rotate through an arc, the amplitude of which is determined by the current passing through the galvanometer and the light from the lamp 9 will project a sharp and clear hairline shadow of the index member 14 upon the scale 5 so as to afford a reading from in front of the screen 4.

From the foregoing description, it will be apparent that I have devised a straight scale indicator which improves the utility of meters without increasing their cost. Such straight scale indicators, by a comparatively simple alteration in structure may be incorporated with meters which now employ the arcuate or crescent scale. Not only is the condition of parallax eliminated such as occurs in connection with the reading of arcuate or crescent scales, but by locating the scale-bearing screen a suitable distance from the light source the markings composing the scale may be spread apart a sufficient distance to render them more easily and accurately read. Furthermore the indicator mechanism is fully protected within the housing in compact out-of-the way position, which also contributes to the neat appearance of the assembly.

While in the foregoing embodiment of my invention the straight scale indicator is employed with a voltmeter, this is merely by way of example and it is obvious that the shaft 12 which actuates the index member 14 may be associated with other kinds of meters so as to be responsive to other than electromotive forces. For example, the shaft 12 might be actuated manually, as in the case of the tuning control shaft of a radio receiving set; or the shaft might be associated with the mechanism of a speedometer to give a reading in miles per hour.

In Fig. 3 is illustrated a slightly modified form of index member. In this modification only a single arm 13a extends from the galvanometer shaft 12 and the index member is formed by a slender filament-like extension of the arm bent at right angles thereto so as to overlie the diffusion member. The shaft 12 may be counterweighted as indicated at 12a to compensate for the weight of the arm and index member.

It is apparent that my straight scale indicator may be embodied in other forms than that described above which is to be regarded as illustrative rather than as restrictive of the invention.

I claim:

1. A straight scale indicator comprising a flat translucent screen having an exposed viewing face, a straight-line scale associated with the screen, a rotary shaft extending parallel to the screen, an arm extending from the shaft, a filament index member carried by the arm and adapted to swing in an arcuate path, means for rotating the shaft to swing the index member, a concave reflector and a lamp mounted in said reflector for projecting a shadow of the index member upon the screen to afford a scale reading, said light source, reflector and index member being located upon the side of the screen opposite its viewing face, and a light diffusion member covering the concave face of the reflector, said diffusion member being arcuately curved and lying closely adjacent the arcuate path of the index member.

2. A meter comprising a housing having an open end, a translucent screen closing the open end of the housing and having an outwardly disposed viewing face, an electrically-responsive device mounted within said housing and having conductors leading to outside the housing for connection to an electrical circuit, a straight-line scale associated with the screen, a rotary shaft operatively associated with the electrically-responsive device and extending parallel to the screen, a pair of arms extending from the shaft, a filament index member connecting the free ends of the arms and adapted to swing in an arcuate path when the shaft is rotated by the electrically-responsive device, a parabolic reflector and a lamp mounted in said reflector for projecting a shadow of the index member upon the screen opposite its viewing face, and a light diffusion member covering the parabolic face of the reflector, said diffusion member being arcuately curved and lying closely adjacent the arcuate path of the index member.

3. In a straight scale indicator, a housing comprising a flat translucent screen having an exposed viewing face, a straight line scale associated with the screen, a rotary shaft extending parallel to the screen, an arm extending from the shaft, an index member carried by the arm and disposed parallel to the shaft, said index member being arranged to be swung by the arm in an arcuate path, said shaft being adapted to be connected to means for rotating the shaft to swing the index member, a concave reflector and means in said reflector for mounting a light to project a shadow of the index member upon the screen for affording a scale reading, said light mounting, reflector and index member being located upon the side of the screen opposite its viewing face, and a light diffusion member covering the concave face of the reflector, said diffusion member being arcuately curved and lying adjacent the arcuate path of the index member.

FORREST H. FRANTZ.